3,542,862
3-(o-AROYLAMINOPHENYL)-LEVULINIC ACIDS

John M. Chemerda, Plainfield, and Meyer Sletzinger North Plainfield, N.J., assignors to Merck & Co., Inc., Rahway, N.J., a corporation of New Jersey
No Drawing. Filed Feb. 19, 1968, Ser. No. 706,660
Int. Cl. C07c *103/30*
U.S. Cl. 260—519       2 Claims

ABSTRACT OF THE DISCLOSURE

New intermediates for the preparation of 1-aroyl-3-indolylacetic acids comprise o-nitrophenylacetones, 1-(o-nitrophenyl)-2-pyrrolidino propenes prepared from the acetones by treatment with pyrrolidine and acid, 3-(o-nitrophenyl)-levulinic acids prepared from the latter by reaction with haloacetic esters, and 3-(o-aroylaminophenyl)-levulinic acids prepared by reducing and aroylating the nitro compounds. The production of the indoles is described.

---

This invention relates to a new method of preparing certain 1-p-benzoyl-2-methyl-3-indolylacetic acid derivatives. More particularly, it relates to a method of preparing 1-p-chlorobenzoyl-2-methyl-3-indolylacetic acid derivatives of the Formula I:

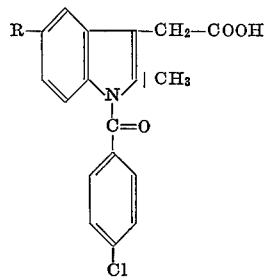

(I)

wherein R is either methoxy or dimethylamino. These compounds are disclosed and claimed in U.S. Pat. 3,161,654, issued Dec. 15, 1964, to Shen.

In the Shen patent, the compounds of Formula I are prepared by a series of reactions wherein a 2-methyl-3-indolylacetic acid is dehydrated to the corresponding anhydride, which is converted to the t-butyl ester by treatment with t-butyl alcohol. The ester is acylated at the 1-position by treatment with para-chlorobenzoyl chloride, and the resultant acylate is converted to the free acetic acid derivative by a pyrolysis process.

It is an object of the present invention to provide a new method and new intermediates used therein for the preparation of compounds of Formula I. Other objects will become apparent from a reading of the ensuing description of the present invention.

In accordance with this invention, it has been discovered that new compounds of the Formula II:

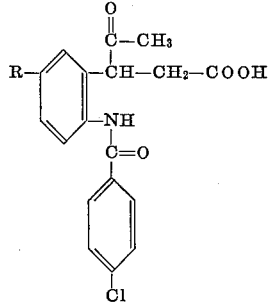

(II)

wherein R is as defined above, can be ring-closed, as will be hereinafter described, to yield compounds of Formula I.

The new compounds of Formula II can be obtained from the known phenylacetones of the Formula III:

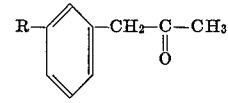

(III)

where R is as defined above. In accordance with one aspect of the present invention, a phenylacetone of Formula III is nitrated by any suitable means to give compounds of the Formula IV:

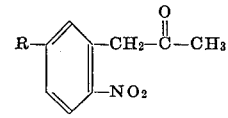

(IV)

The nitration is accomplished with a mixture of concentrated nitric acid and concentrated sulfuric acid at ambient temperatures. It is desirable to prevent the temperature from rising too high, and this may require extraneous cooling. After the reaction has proceeded for one or two hours, the new compounds of Formula IV may be isolated by quenching the reaction mixture with ice and extraction with a solvent such as ether. In the case of the material of Formula IV wherein R is dimethylamino, better yields are obtained when the extraction with the organic solvent is preceded by treatment with an alkaline material to raise the pH to a range of 4 to 5. Products of Formula IV are obtained in pure form by chromatography of the solvent concentrates over silica gel.

Compounds of Formula IV can, in another aspect of the present invention, be converted by one of two alternative routes. By one route, compounds of Formula IV are treated with an excess of pyrrolidine in the presence of an acid to effect the preparation of a pyrrolidino derivative of the Formula V:

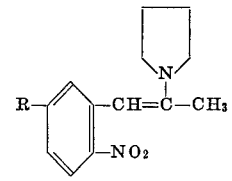

(V)

The preparation of the pyrrolidino derivative is effected in a solvent medium such as benzene or toluene using an excess of pyrrolidine. Reaction is conducted at reflux temperature whereby water is removed by azeotropic distillation with the solvent. Compound of Formula V can be isolated by chromatograph over a fluorosil column.

Treatment of compounds of Formula V with an alpha-haloacetic acid ester (for example, lower alkyl chloroacetic acid esters such as ethyl chloroacetate) results in the addition of the haloacetate across the double bond and the formation of compounds of the Formula VI:

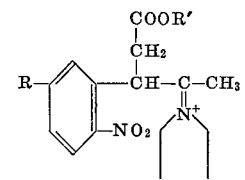

(VI)

wherein R is as defined above and R′ is lower-alkyl.

Compounds of Formula VI can be hydrolyzed in water, thereby affording the compounds of the Formula VII:

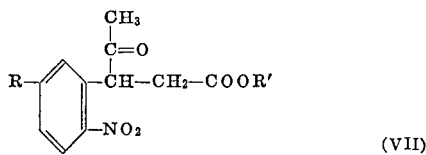

wherein R and R' are as defined above. The latter can be obtained by extraction with an organic solvent such as ether and concentration to the desired compound.

By an alternative route, compounds of Formula VII can be prepared directly from compounds of Formula IV by treatment of a solution of the latter with a haloacetate such as a lower alkyl chloroacetate (e.g., methyl chloroacetate). This reaction is preferably effected in the presence of a basic material such as an alkali metal alkoxide (e.g., potassium t-butoxide). Refluxing of the reaction mixture completes the reaction and affords a solution of the product of Formula VII.

Treatment of compounds of Formula VII with a reducing agent which is selective for the nitro group results in the formation of compounds of the Formula VIII:

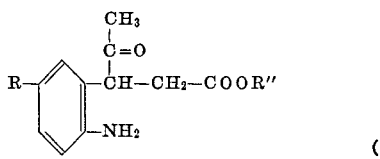

wherein R is as defined above and R″ is either hydrogen or lower alkyl. A suitable reducing agent for this purpose is a mixture of ferrous salt and aqueous ammonia. The reaction is preferably conducted by adding the nitro compound in ammoniacal solution to a boiling solution of the ferrous compound (e.g., ferrous sulfate). Additional ammonia can be added with agitation to the reducing solution until the solution is distinctly basic. After standing, the reaction mixture can be filtered and the filtrate acidified to a pH of 3 to 4 to yield the precipitated product, which can be filtered in vacuo. It should be noted that the compound of Formula VIII is in tautomeric equilibrium with the corresponding 2-hydroxy-2-methyl-3-indolinylacetic acid.

Acylation of the compounds of Formula VIII with a para-chlorobenzoyl halide or p-chlorobenzoic acid anhydride yields the desired compound of Formula II. This acylation is preferably conducted in the presence of a base such as pyridine at a temperature between the freezing point and the boiling point of the mixture. After several hours, the reaction mixture containing the product of Formula II is concentrated in vacuo and acidified at a low temperature, extracted with a solvent, and the extracts dried and concentrated to dryness. Further purification can be effected by recrystallization from a solvent such as t-butanol, ethanol or acetone-hexane.

In another aspect of the present invention, compounds of Formula II can be obtained by oxidation of a hydroxy acid of the Formula IX:

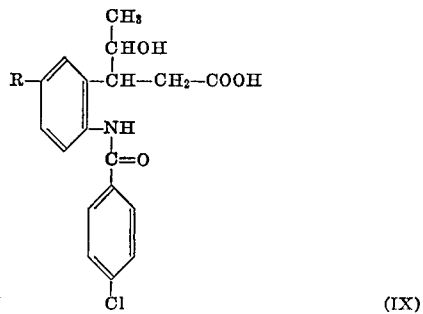

wherein R is as defined above. This oxidation reaction can be effected by any reagent capable of converting the secondary alcoholic group to a keto radical without concurrently disrupting the remainder of the molecule. Suitable reagents for this purpose are a mixture of chromium trioxide in pyridine. Reaction can be conducted at room temperature using equivalent amount of oxidation and starting materials. After standing, the product of Formula II can be isolated from the reaction mixture by quenching in ice water, acidification and extraction with a solvent such as ether. The solvent extracts are washed with water, dried, filtered and concentrated in vacuo to yield product of Formula II.

The starting materials for the latter process (compounds of Formula IX) are obtainable from 2-nitro-5-methoxy-cinnamates by the following sequence of reactions. The cinnamate is treated with nitroethane, resulting in the addition of the nitroethyl group in the alpha-position of the cinnamyl side chain; the latter is oxidized to yield the alpha-aceto derivative, which is reduced to the secondary alcohol. Treatment of the latter with a reducing agent to convert the nitro derivative to an amino derivative and acylation on the amino groups with p-chlorobenzoyl halide gives the compounds of Formula IX.

Compounds of Formula II are readily converted to the desired compounds of Formula I by a ring-closure reaction employing a reagent which is capable of removing one mole of water from the starting material. Suitable for this purpose are strong inorganic acids such as concentrated hydrochloric acid, or organic acids such as trifluoroacetic acid. This reaction is preferably conducted under mild conditions. After several hours, the reaction mixture can be worked up by extraction with a solvent such as ether, drying and concentration of the extract. Recrystallization of the residue yields the desired compounds of Formula I in pure form.

The following examples are presented to further illustrate the present invention.

Example 1.—Preparation of 2-nitro-5-methoxyphenylacetone

To a solution of 35 ml. of concentrated nitric acid and 74 g. of concentrated sulfuric acid was added slowly with stirring and maintenance of temperature at 15–20° C., 0.3 mole of meta-methoxyphenylacetone. The reaction mixture was stirred at 20° C. for 2 hours and quenched in ice. The resulting mixture was extracted with ether and the concentrate chromatographed over silica gel to give 2-nitro-5-methoxyphenylacetone.

Example 2.—Preparation of 2-nitro-5-dimethylaminophenylacetone

To a solution of 35 ml. of concentrated nitric acid and 74 g. of concentrated sulfuric acid was added slowly with stirring and maintenance of temperature at 15–20° C., 0.3 mole of meta-dimethylaminophenylacetone. The reaction mixture was stirred at 15° C. for 2 hours, quenched in ice and rendered basic with 30% sodium hydroxide. Extraction with ether, concentration and chromatography over silica gel gave the product 2-nitro-5-dimethylaminophenylacetone.

Example 3.—Preparation of 1-(2'-nitro-5'-methoxyphenyl)-2-pyrrolidinylpropene

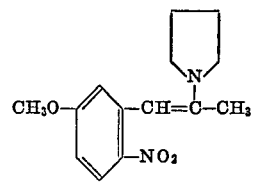

To 0.1 equivalent of the product of Example 1 dissolved in 300 ml. of benzene was added 0.2 equivalent of pyrrolidine. The mixture was heated to reflux and the water azeotrope removed by a Fisher separator. After about 5 hours, benzene was evaporated to dryness in vacuo leaving a residue of the above enamine.

Example 4.—Preparation of 1-(2'-nitro-5'-dimethylaminophenyl)-2-pyrrolidinylpropene

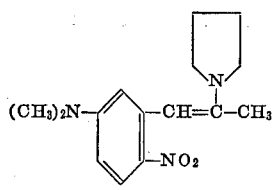

To 0.1 equivalent of the product of Example 2 dissolved in 300 ml. of benzene was added 0.2 equivalent of pyrrolidine. The mixture was heated to reflux and the water azeotrope removed by a Fisher separator. After about 5 hours, the benzene was evaporated in vacuo leaving a residue of the product.

Example 5.—Preparation of ethyl-3-(2'-nitro-5'-methoxyphenyl)-levulinate

To .1 equivalent of the product of Example 3 in 100 ml. of dioxane was added 0.1 equivalent of ethyl chloroacetate. The reaction was refluxed for 10 hours. Ten ml. of water was added and the reaction was refluxed an additional 3 hours. At the end of this time, the dioxane was concentrated in vacuo and the concentrate diluted with 100 ml. of water and extracted with ether. Concentration of the latter gave a residue of ethyl-3-(2'-nitro-5'-methoxyphenyl)-levulinate. This was purified by chromatography over fluorosil.

Example 6.—Preparation of ethyl-3-(2'-nitro-5'-dimethylaminophenyl)-levulinate

To .1 equivalent of the product of Example 4 in 100 ml. of dioxane was added 0.1 equivalent of ethyl chloroacetate. The reaction was heated to reflux for 2 hours. Ten ml. of water was added and the reaction was refluxed an additional 3 hours. At the end of this time, the dioxane was concentrated in vacuo and the concentrate diluted with 100 ml. of water and extracted with ether. Concentration of the ether layer gave a residue of ethyl-3-(2'-nitro-5'-dimethylaminophenyl)-levulinate. This was purified by chromatography over fluorosil.

Example 7.—Preparation of ethyl 3-(2'-nitro-5'-methoxyphenyl)-levulinate by alternative route A solution of 2-nitro-5-methoxyphenylacetone (0.1 mole) in 300 ml. of benzene and 0.11 mole of potassium t-butoxide was stirred at 25° C. for one hour. After this period, 0.1 mole of ethyl chloroacetate was added at 25–30° C. The mixture was stirred for 30 minutes to complete the reaction and then washed with 10% aqueous HCl. The organic layer was dried over sodium sulfate, filtered and concentrated to dryness. The residue was hydrolyzed in a 1:1 aqueous methanolic solution containing 5 ml. of concentrated HCl at reflux for one hour. Upon dilution with 500 ml. of water, the reaction mixture was extracted with ether, washed with water and concentrated in vacuo. The residue was taken up in aqueous bicarbonate solution, filtered from insolubles and then precipitated with concentrated HCl. The product was obtained by filtration and drying.

Example 8.—Preparation of ethyl 3-(2'-nitro-5'-dimethylaminophenyl)-levulinate by alternative route A solution of the product of Example 2 (0.1 mole) in 300 ml. of benzene and 0.1 mole of potassium t-butoxide was stirred at 25° C. for one hour. After this period, 0.1 mole of ethyl chloroacetate was added at 25–30° C. The mixture was refluxed for 30 minutes to complete the reaction. The organic layer was dried over sodium sulfate, filtered and concentrated to dryness. The residue was hydrolyzed in a 1:1 aqueous methanolic solution containing 5 ml. of concentrated hydrochloric acid at reflux for one hour. Upon dilution with 500 ml. of water, the mixture was neutralized to pH 3–4 and extracted with chloroform. The extracts were concentrated to dryness to give the product.

Example 9.—Preparation of 3-(2'-amino-5'-methoxyphenyl)-levulinic acid

A 500 ml. 5% ammoniacal solution containing 0.1 equivalent of ethyl 3-(2'-nitro-5'-methoxyphenyl)-levulinate is added to a boiling solution of 0.7 equivalent of crystalline ferrous sulfate in 2–3 parts of water. The solution is treated with small portions of concentrated ammonia with good agitation. When the solution is distinctly alkaline, the reaction mixture is stirred for an additional hour and then filtered from insoluble impurities. The filtrate is acidified carefully to a pH of 3–4 and the crystalline solid separated and dried in vacuo, thereby yielding the product.

Example 10.—Preparation of 3-(2'-amino-5'-dimethylaminophenyl)-levulinic acid

A 500 ml. 5% ammoniacal solution containing 0.1 equivalent of ethyl 3-(2'-nitro-5'-dimethylaminophenyl)-levulinate is added to a boiling solution of 0.7 equivalent of crystalline ferrous sulfate in 2–3 parts of water. The solution is treated with small portions of concentrated ammonia with good agitation. When the solution is distinctly alkaline, the reaction mixture is stirred for an additional hour and then filtered from insoluble impurities. The filtrate is acidified carefully to a pH of 3–4 and the crystalline solid separated and dried in vacuo, thereby yielding the product.

Example 11.—Preparation of 3-[2'-(p-chlorobenzamido)-5'-methoxyphenyl]-levulinic acid The product of Example 9, 3-(2-amino-5-methoxyphenyl)-levulinic acid (0.1 mole), was dissolved in 50 ml. of pyridine and with cooling and stirring, treated with 0.1 mole of p-chlorobenzoyl chloride. Keeping the reaction mixture at 10–15° C. for 3 hours, the mixture was quenched in 500 ml. of ice water and acidified with concentrated HCl, keeping the temperature below 15° C. The mixture was extracted with ether, dried over sodium sulfate and concentrated to dryness. Recrystallization of the residue from acetone-hexane gave the crystalline product, melting at 173–175° C.

Example 12.—Preparation of 3-[2'-(p-chlorobenzamido)-5'-dimethylamino-phenyl]-levulinic acid The product of Example 10 (0.1 mole) was dissolved in 50 ml. of pyridine and with cooling and stirring, treated with 0.1 mole of p-chlorobenzoyl chloride. After keeping the reaction mixture at 10–15° C. for 3 hours, the mixture was quenched in 500 ml. of ice water and acidified with concentrated HCl, keeping the temperature below 15° C. to a pH of 4. The mixture was extracted with chloroform. The extracts were dried over sodium sulfate and concentrated, thereby affording the desired crystalline compound, melting at 176–177° C.

Example 13.—Preparation of 3-[2'-(p-chlorobenzamido)-5'-methoxyphenyl]-levulinic acid by alternative procedure A solution of 3-[2'-(p-chlorobenzamido)-5'-methoxyphenyl]-4-hydroxyvaleric acid (0.001 equivalent) in 4 ml. of pyridine was added to the complex formed by the addition of 400 mg. of chromium trioxide in 4 ml. of pyridine. The mixture is stirred and allowed to stand at room temperature for 5 hours, after which it is quenched in ice water, acidified to pH 3–4 and extracted with ether. The ether extracts are washed with water and dried over sodium sulfate. After filtration and concentration in vacuo, the residue is crystallized from acetone-hexane to give the crystalline product.

Example 14.—Preparation of 3-[2'-(p-chlorobenzamido)-5'-dimethylaminophenyl]-levulinic acid by alternative procedure A solution of 0.001 equivalent of 3-[12'-(p-chlorobenzamido) - 5'-dimethylaminophenyl]-4-hydroxyvaleric acid in 4 ml. of pyridine was added to the complex formed by the addition of 400 mg. of chromium trioxide in 4 ml. of pyridine. The mixture was stirred and allowed to stand at room temperature for 5 hours, after which it is quenched in ice water and acidified to pH 4. The mixture is extracted with chloroform, the extracts washed with water, dried over sodium sulfate, filtered to remove insolubles and concentrated in vacuo, leaving the solid product. Recrystallization of the product from acetone-hexane gives the pure crystalline product.

Example 15.—Preparation of 1-p-chlorobenzoyl-2-methyl-5-methoxy-3-indolylacetic acid .1 equivalent of the product of Example 13 was dissolved in 3 liters of acetone and 2 ml. of 10% HCl was added. The solution was refluxed for 6 hours under nitrogen and concentrated in vacuo. The residues was crystallized by trituration with water. The solid, after recrystallization and drying from benzene, melted at 153–155° C.

Example 16.—Preparation of 1-p-chlorobenzoyl-2-methyl-5-dimethylamino-3-indolylacetic acid .1 equivalent of the product of Example 14 as the hydrochloride salt was suspended in 3 liters of acetone and 10 ml. of 2% HCl was added. The solution was refluxed for 10 hours under nitrogen and then concentrated from the acetone in vacuo. The residue was taken up in 200 ml. of water. Upon neutralization to pH 4–5 with 5% NaOH, a precipitate of the product separated. Recrystallization of of aqueous ethanol gave pure product of melting point 176–177° C.

We claim:
1. A compound of the formula:

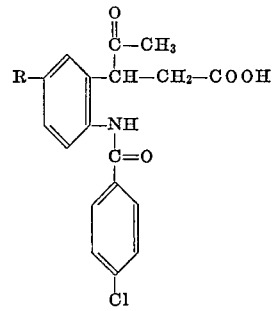

wherein R is methoxy or dimethylamino.

2. The compound of claim 1 wherein R is methoxy.

References Cited

Fieser, L. F. et al.: Reagents for Organic Synthesis (1967), pub. by John Wiley & Sons, Inc. New York QD 262' F 5 C. 3, pp. 142 and 143 relied on.

LORAINE A. WEINBERGER, Primary Examiner

L. A. THAXTON, Assistant Examiner

U.S. Cl. X.R.

260—326.14, 326.85, 326.87, 471, 518, 577, 590